US012742922B2

(12) United States Patent
Lee et al.

(10) Patent No.: US 12,742,922 B2
(45) Date of Patent: Sep. 22, 2026

(54) DISPLAY DEVICE

(71) Applicant: LITE-ON Technology Corporation, Taipei (TW)

(72) Inventors: Kuei-Ming Lee, Taipei (TW); Jun-He Hong, Taipei (TW)

(73) Assignee: LITE-ON Technology Corporation, Taipei (TW)

( * ) Notice: Subject to any disclaimer, the term of this patent is extended or adjusted under 35 U.S.C. 154(b) by 33 days.

(21) Appl. No.: 19/251,834

(22) Filed: Jun. 27, 2025

(65) Prior Publication Data

US 2026/0043958 A1 Feb. 12, 2026

Related U.S. Application Data

(60) Provisional application No. 63/681,888, filed on Aug. 12, 2024.

(30) Foreign Application Priority Data

Apr. 18, 2025 (CN) ......................... 202520737619.4

(51) Int. Cl.
*F21V 8/00* (2006.01)

(52) U.S. Cl.
CPC ........... *G02B 6/0076* (2013.01); *G02B 6/006* (2013.01); *G02B 6/0068* (2013.01)

(58) Field of Classification Search
CPC ....... G09F 13/18; G02B 6/0068; G02B 6/006; G02B 6/0076
See application file for complete search history.

(56) References Cited

U.S. PATENT DOCUMENTS

2025/0271607 A1* 8/2025 Lim ....................... B60K 35/22

FOREIGN PATENT DOCUMENTS

CN 101059623 A * 10/2007 ........... G02F 1/1335
WO WO-2023279224 A1 * 1/2023 ............... G02B 6/00

OTHER PUBLICATIONS

NPL Search Innovationq+ (Year: 2025).*

* cited by examiner

*Primary Examiner* — Anabel Ton

(57) ABSTRACT

A display device includes a circuit board, a first light source module, a second light source module, and a first light absorption module. The first light source module is disposed above the circuit board and includes a first light guide plate and a first light source adjacent to the first light guide plate. The second light source module is disposed above the first light source module and includes a second light guide plate and a second light source adjacent to the second light guide plate. The first light source module is disposed between the second light source module and the circuit board. The first light absorption module is disposed between the circuit board and the first light guide plate or between the first light source module and the second light guide plate. By the aforementioned arrangement, the display effects of the display device are enhanced.

11 Claims, 11 Drawing Sheets

DISPLAY DEVICE

CROSS-REFERENCE TO RELATED APPLICATIONS

This application claims the priority benefit of Provisional Patent Application Ser. No. 63/681,888 filed on Aug. 12, 2024 and Chinese Patent Application Serial Number 2025207376194 filed on Apr. 18, 2025, the full disclosure of which is incorporated herein by reference.

TECHNICAL FIELD OF THE DISCLOSURE

The disclosure relates to display technologies and particularly relates to a display device.

DESCRIPTION OF THE PRIOR ART

As technologies daily develop, display devices are gradually applied to numerous electronic devices. In order to fulfill the effects of displaying different patterns, multiple layers of light source modules are usually stacked and disposed in the current display device and separately have a light source and a light guide plate, and there are different optical patterns formed on each light guide plate. By turning on the light sources of the different light source modules respectively under different time or different occasions and by the optical patterns corresponding to the light guide plates to reflect light from the light sources, the current display device displays different display patterns.

However, in the structure of the current display device, when the light guide plate of one of the multiple layers of light source modules is lighted, stray light emitted from the light source module is scattered on the light guide plate of the adjacent light source module, and thus the optical pattern of the light guide plate of the adjacent light source module is accidentally lighted, thereby causing a user to perceive the optical pattern of the adjacent light guide plate when watching the display device and influencing the display effects of the display device.

Hence, in order to cure the deficiencies of the prior art, there is a need to provide a better solution indeed.

SUMMARY

In light of the deficiencies of the prior art, the main object of the disclosure is to provide a display device which solves the problem of the undesired illumination of the display patterns of the adjacent light guide plates by arranging at least one light absorption module, thereby enhancing the display effects of the display device.

In order to solve the foregoing problem, one technical solution adopted by the disclosure is to provide a display device including: a circuit board, a first light source module, a second light source module, and a first light absorption module. The first light source module is disposed above the circuit board and includes a first light guide plate and a first light source adjacent to the first light guide plate. The first light guide plate has a first optical pattern. The second light source module is stacked and disposed above the first light source module and includes a second light guide plate and a second light source adjacent to the second light guide plate. The second light guide plate has a second optical pattern, and the first light source module is disposed between the second light source module and the circuit board. The first light absorption module is disposed between the circuit board and the first light guide plate.

According to the aforementioned structure, the disclosure may prevent the first light source module and the second light source module from generating light disturbances by arranging the first light absorption module between the circuit board and the first light guide plate, thereby solving the problem of the undesired illumination of the display patterns of the adjacent light guide plates and fulfilling the objective of enhancing the display effects of the display device.

In order to solve the foregoing problem, the other technical solution adopted by the disclosure is to provide a display device including: a circuit board, a first light source module, a second light source module, and a first light absorption module. The first light source module is disposed above the circuit board and includes a first light guide plate and a first light source adjacent to the first light guide plate. The first light guide plate has a first optical pattern. The second light source module is stacked and disposed above the first light source module and includes a second light guide plate and a second light source adjacent to the second light guide plate. The second light guide plate has a second optical pattern, and the first light source module is disposed between the second light source module and the circuit board. The first light absorption module is disposed between the first light source module and the second light guide plate.

According to the aforementioned structure, the disclosure may prevent the first light source module and the second light source module from generating the light disturbances by arranging the first light absorption module between the first light source module and the second light guide plate, thereby solving the problem of the undesired illumination of the display patterns of the adjacent light guide plates and fulfilling the objective of enhancing the display effects of the display device.

DETAILED DESCRIPTION

Figure 1:
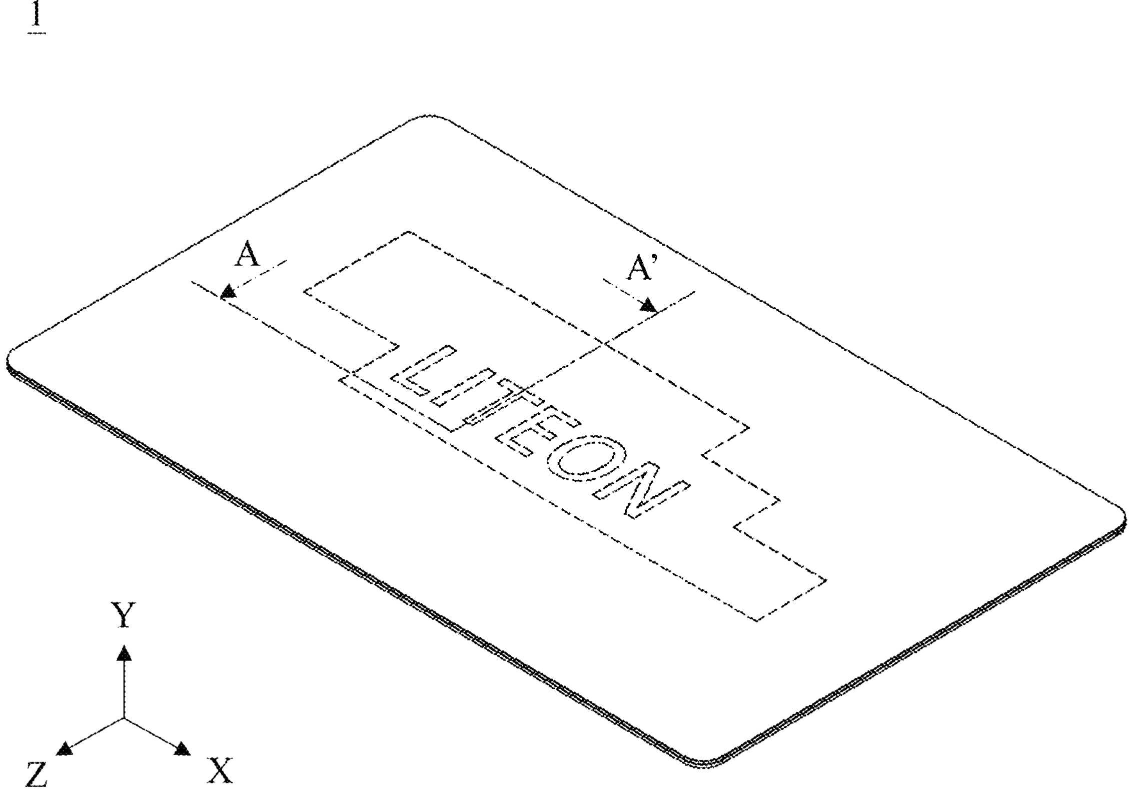
FIG. 1 depicts the 3D diagram of a display device according to the first embodiment of the disclosure.
Figure 2:
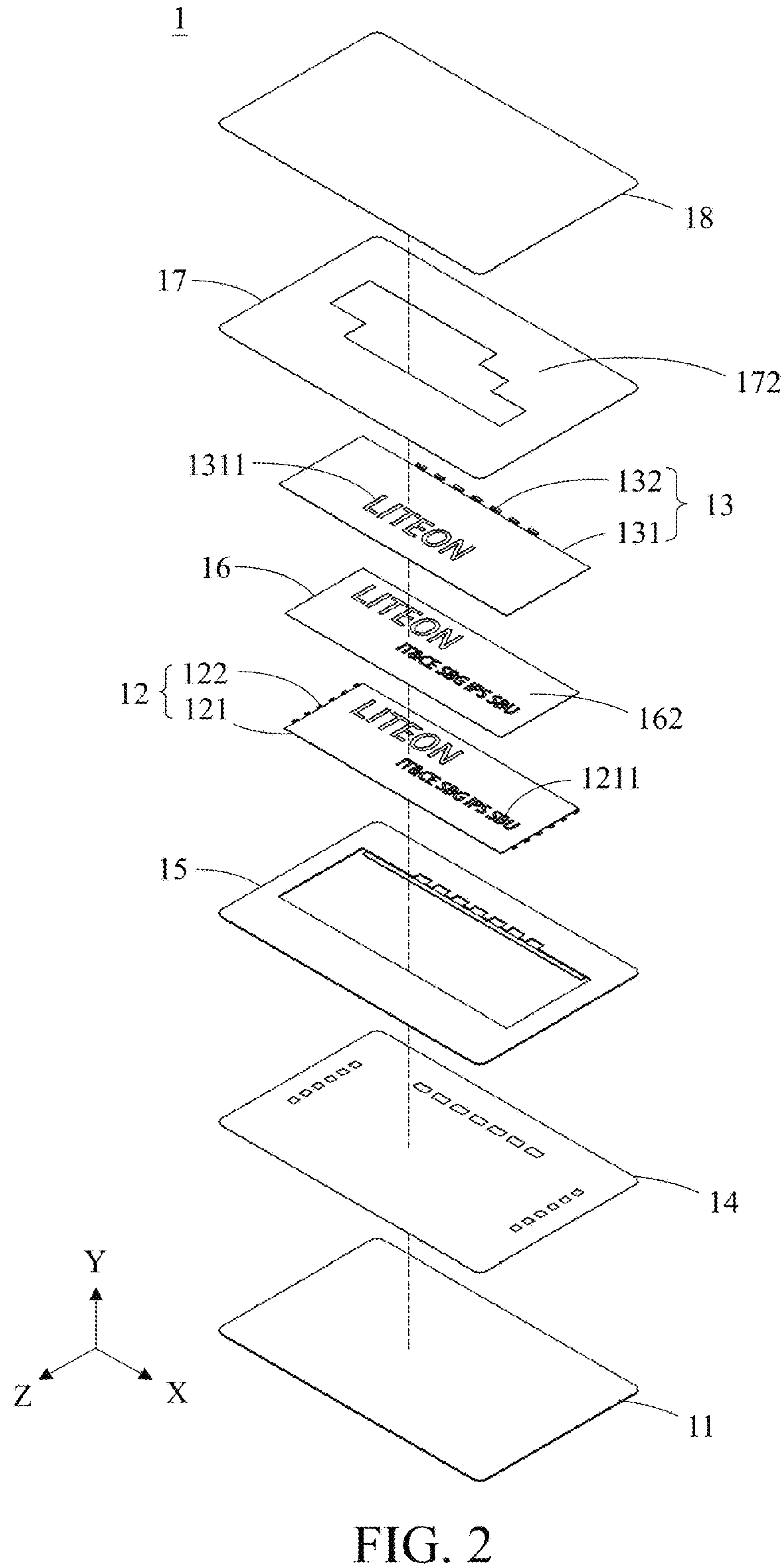
FIG. 2 depicts the exploded diagram of the display device according to the first embodiment of the disclosure.
Figure 3:
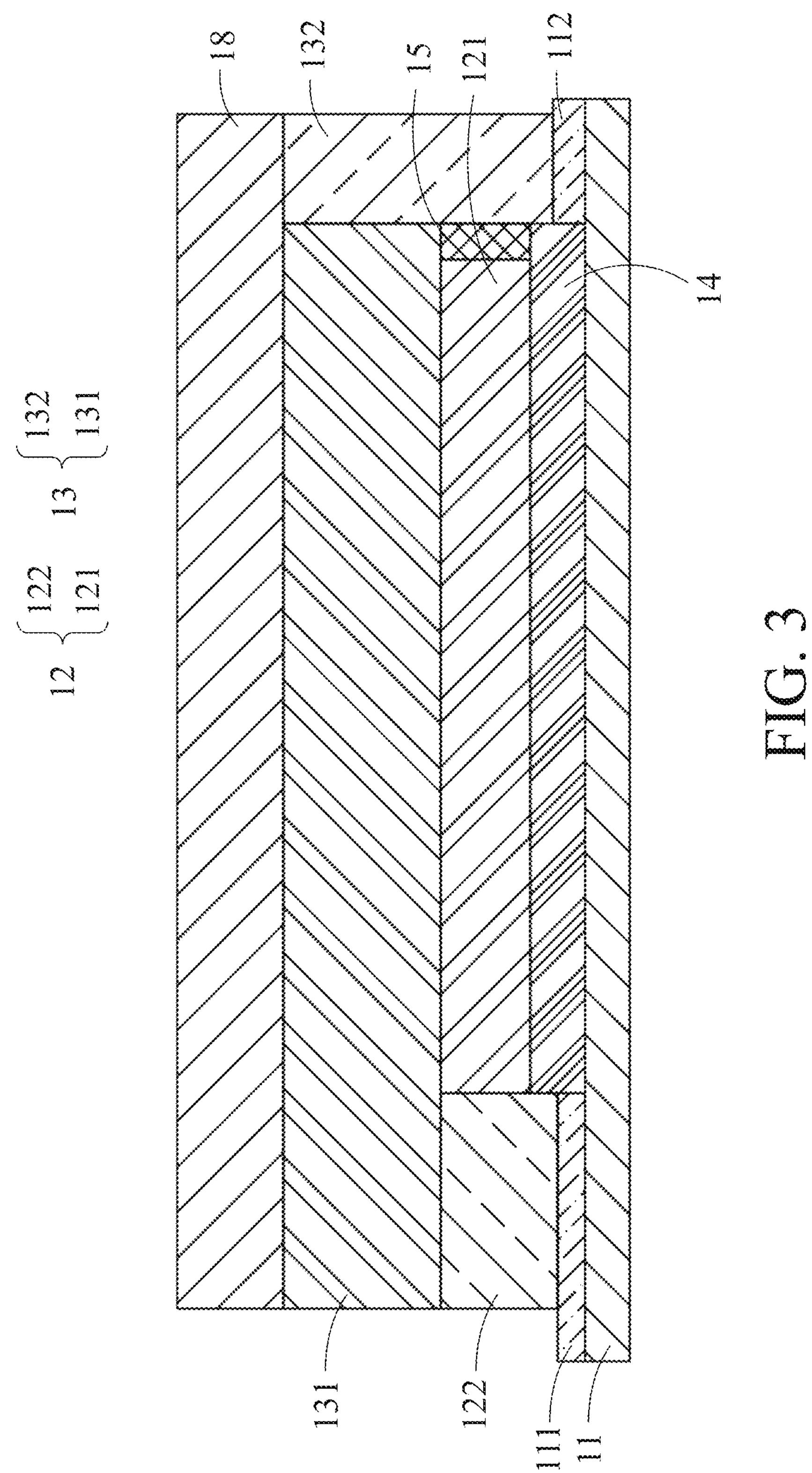
FIG. 3 depicts a cross-section diagram sectioned from A-A' line of FIG. 1 according to the first embodiment of the disclosure.

With regards to a display device 1 in the first embodiment of the disclosure, referring to FIG. 1 to FIG. 3, the display device 1 includes a circuit board 11, a first light source module 12, a second light source module 13, and a first light absorption module 14. The circuit board 11 is configured to provide the necessary control signals of the first light source module 12 and the second light source module 13 during light emission. The first light source module 12 is stacked and disposed above the circuit board 11 and includes a first light guide plate 121 and a first light source 122. The first light source 122 is disposed on one side of the circuit board 11 and is adjacent to the first light guide plate 121. The first light source 122 is configured to receive the control signal from the circuit board 11 to generate light based on the received control signal and provides the needed light of the first light guide plate 121 along a first direction X. There is a first optical pattern 1211 formed on the first light guide plate 121. In other words, the first light guide plate 121 has the first optical pattern 1211. The first light guide plate 121 reflects the light from the first light source 122 in a second direction Y by the first optical pattern 1211 to show one display pattern. The first direction X is perpendicular to the second direction Y, and the second direction Y is parallel to a direction where the circuit board 11, the first light source module 12, the second light source module 13, and the first light absorption module 14 are stacked. The second light source module 13 is stacked and disposed above the first light source module 12 so that the first light source module 12 is disposed between the second light source module 13 and the circuit board 11. The second light source module 13 includes a second light guide plate 131 and a second light source 132, the second light guide plate 131 is stacked and disposed above the first light guide plate 121, and the second light source 132 is disposed on the other side of the circuit board 11 and is adjacent to the second light guide plate 131. The second light source 132 is configured to receive the control signal from the circuit board 11 to generate light based on the received control signal and provides the needed light of the second light guide plate 131 along a third direction Z. The third direction Z is perpendicular to the first direction X and the second direction Y. There is a second optical pattern 1311 formed on the second light guide plate 131. In other words, the second light guide plate 131 has the second optical pattern 1311. The second light guide plate 131 reflects the light from the second light source 132 in a second direction Y by the second optical pattern 1311 to show the other display pattern. The first light absorption module 14 is disposed between the circuit board 11 and the first light guide plate 121, and the first light absorption module 14 is configured to absorb stray light emitted in a direction toward the circuit board 11.

For example, the first optical pattern 1211 and the second optical pattern 1311 may be respectively formed on the surface of the first light guide plate 121 and the surface of the second light guide plate 131 by stamping. The first optical pattern 1211 and the second optical pattern 1311 may be separately constituted by plenty of concave microstructures. The concave microstructures may be arranged as particular patterns according to design requirements (e.g., English letters and numbers) to form the first optical pattern 1211 and the second optical pattern 1311 separately.

In the aforementioned structure, the first light absorption module 14 is disposed between the circuit board 11 and the first light guide plate 121 so that the stray light of the first light guide plate 121 emitted in the direction toward the circuit board 11 may be absorbed by the first light absorption module 14, and the first light source module 12 and the second light source module 13 are further prevented from generating light disturbances to solve the problem of the undesired illumination of the display patterns of the adjacent light guide plates and to enhance the display effects of the display device.

Figure 4:
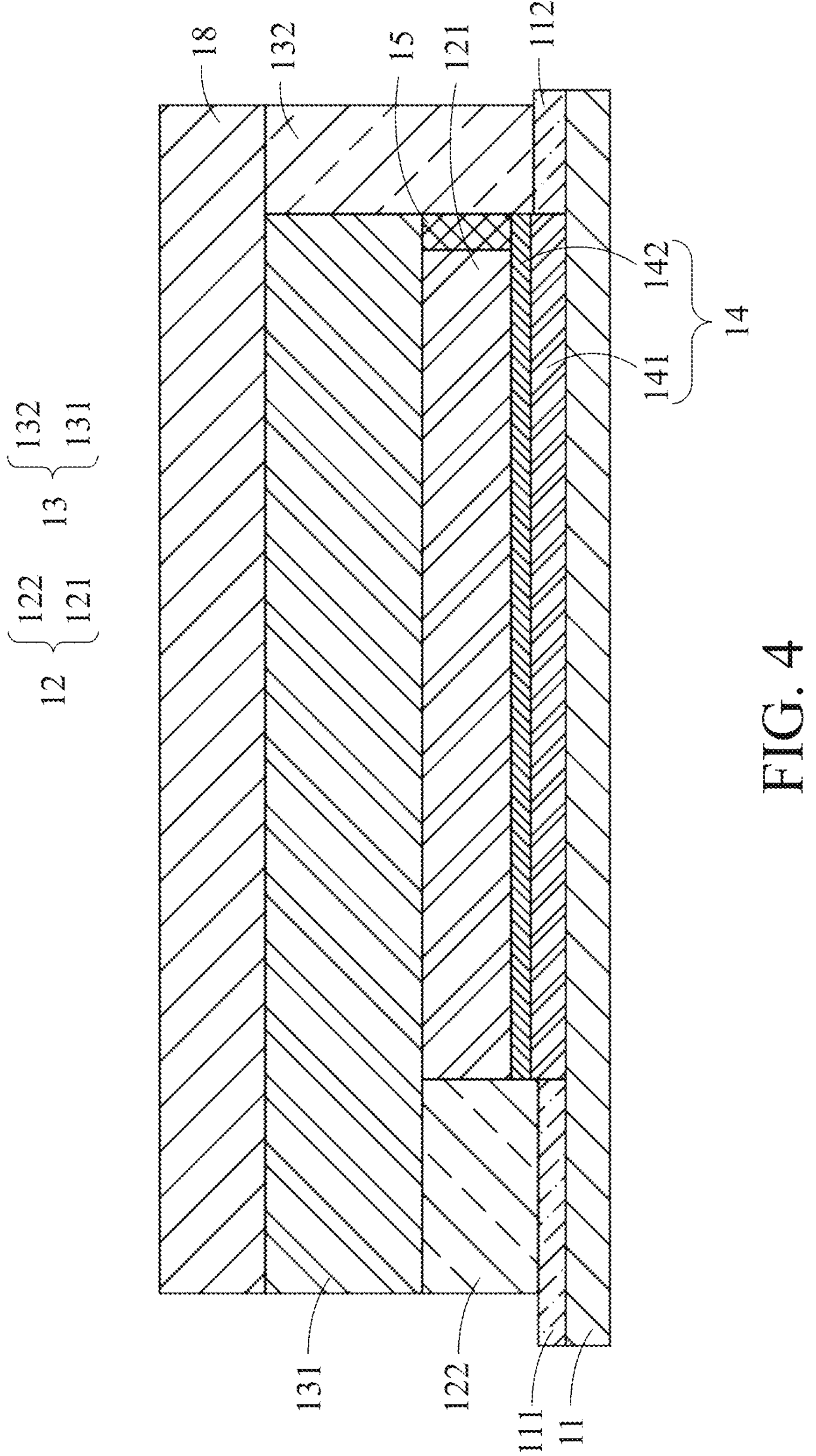
FIG. 4 depicts another cross-section diagram sectioned from A-A' line of FIG. 1 according to the first embodiment of the disclosure.

Referring to FIG. 4, the following will elaborate the arrangement of the first light absorption module 14. In the present embodiment, the first light absorption module 14 includes a substrate 141 and a first light absorption layer 142, the substrate 141 is disposed between the circuit board 11 and the first light guide plate 121 and contacts the circuit board 11, and the first light absorption layer 142 is disposed between the substrate 141 and the first light guide plate 121. The first light absorption layer 142 may be composed of black ink and may be formed on the surface of the substrate 141 adjacent to the first light guide plate 121 by printing or coating so that the first light absorption layer 142 absorbs the stray light emitted from the first light guide plate 121, thus preventing the stray light of the first light guide plate 121 from scattering on the second light source module 13. In the present embodiment, a surface roughness process may be performed on the surface of the first light absorption layer 142 adjacent to the first light guide plate 121 so that the surface of the first light absorption layer 142 adjacent to the first light guide plate 121 is matte. By the foregoing arrangement, the reflectance and the glossiness of the first light absorption layer 142 may be significantly reduced to further enhance the effects of light absorption. For example, the reflectance of the first light absorption layer 142 may be less than 10%, and the glossiness of the first light absorption layer 142 may be less than 10 GU.

As shown in FIG. 2 to FIG. 4, in the present embodiment, the first light source 122 and the second light source 132 may be respectively constituted by plenty of first light emission components and plenty of second light emission components. The first light emission components may be disposed on one side of the circuit board 11 along the third direction Z and be separately arranged. The second light emission components may be disposed on the other side of the circuit board 11 along the first direction X and be separately arranged. For example, the first light emission component and the second light emission component may be a light-emitting diode (LED) or a cold cathode fluorescent lamp (CCFL) but not be limited thereto. As shown in FIG. 3 and FIG. 4, a first solder layer 111 and a second solder layer 112 are respectively disposed at the position of the circuit board 11 corresponding to the first light source 122 and the position of the circuit board 11 corresponding to the second light source 132. The first light source 122 and the second light source 132 are respectively fixed and disposed at the first solder layer 111 and the second solder layer 112 to constitute electrical connections with the circuit board 11.

In addition, in the present embodiment, the display device 1 further includes a light blocking component 15 and a cover plate 18. The light blocking component 15 is disposed between the first light guide plate 121 and the second light source 132 to be configured to separate the first light guide plate 121 and the second light source 132 and to prevent the light emitted by the second light source 132 from entering the first light guide plate 121. For example, the adopted materials of the light blocking component 15 may include sponges, and the adopted materials of the cover plate 18 may include glass, acrylic, acrylic acid resin, acrylic acid copolymers or the other transparent materials.

Figure 5:
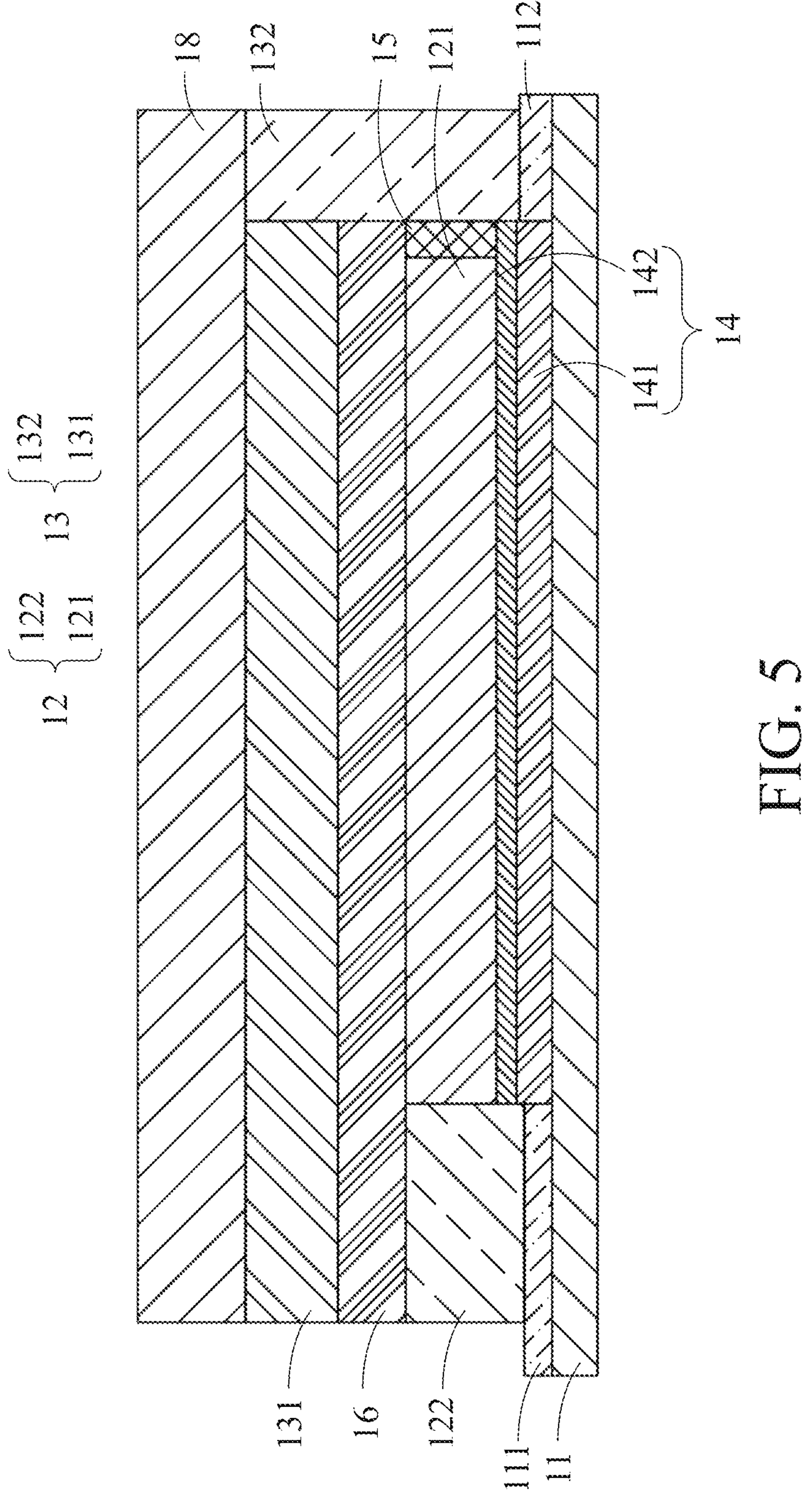
FIG. 5 depicts another cross-section diagram sectioned from A-A' line of FIG. 1 according to the first embodiment of the disclosure.

Referring to FIG. 2 and FIG. 5, the following will elaborate on how to further enhance the effects of absorbing the stray light. In the present embodiment, the display device 1 of the disclosure further includes a second light absorption module 16 disposed between the first light guide plate 121 of the first light source module 12, the first light source 122, and the second light guide plate 131.

By arranging the second light absorption module 16 between the first light guide plate 121, the first light source 122, and the second light guide plate 131, the stray light of the first light guide plate 121 emitted in the direction toward the second light guide plate 131 and the stray light of the second light guide plate 131 emitted in the direction toward the first light guide plate 121 may be absorbed by the second light absorption module 16, and the first light source module 12 and the second light source module 13 are further prevented from generating the light disturbances to enhance the display effects of the display device.

Figure 6:
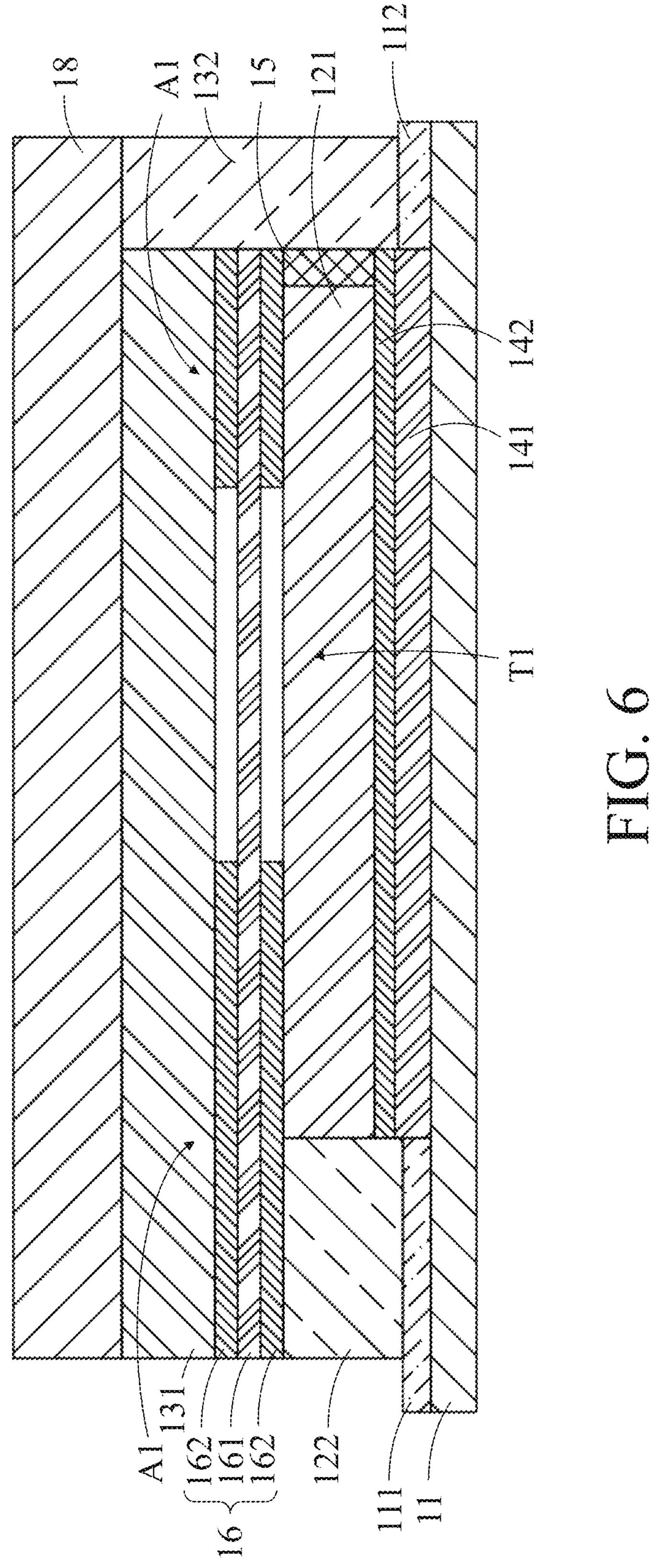
FIG. 6 depicts another cross-section diagram sectioned from A-A' line of FIG. 1 according to the first embodiment of the disclosure.

Please refer to FIG. 6. In the present embodiment, the second light absorption module 16 includes a first light transparent layer 161 and a second light absorption layer 162. The first light transparent layer 161 is provided with a lower surface and an upper surface in the second direction Y which are opposite. The lower surface of the first light transparent layer 161 is adjacent to the first light guide plate 121, the first light source 122, and the light blocking component 15. The upper surface of the first light transparent layer 161 is adjacent to the second light guide plate 131. The second light absorption layer 162 partially overlays at least one of the lower surface and the upper surface of the first light transparent layer 161. In the present embodiment, a portion of the lower surface or the upper surface of the first light transparent layer 161 is exposed by the second light absorption layer 162 to form a first light transparent region T1. For example, the first light transparent layer 161 may be composed of polyester films, and the second light absorption layer 162 may be composed of black ink.

In the aforementioned structure, when there is only one layer of second light absorption layer 162, the second light absorption layer 162 may partially overlay the lower surface of the first light transparent layer 161 so that the stray light of the first light guide plate 121 emitted in the direction toward the second light guide plate 131 may be absorbed by the second light absorption layer 162 and be further prevented from being transmitted to the second light source module 13. Alternatively, the second light absorption layer 162 may partially overlay the upper surface of the first light transparent layer 161 so that the stray light of the second light guide plate 131 emitted in the direction toward the first light guide plate 121 may be absorbed by the second light absorption layer 162 and be further prevented from being transmitted to the first light source module 12. When there are two layers of second light absorption layers 162, two layers of second light absorption layers 162 may partially overlay both of the lower surface and the upper surface of the first light transparent layer 161 to absorb the stray light emitted from the first light guide plate 121 and the stray light emitted from the second light guide plate 131, and the first light source module 12 and the second light source module 13 are prevented from generating the light disturbances to further enhance the display effects of the display device.

As shown in FIG. 2 and FIG. 6, the region of the lower surface and/or the upper surface of the first light transparent layer 161 overlaid by the second light absorption layer 162 constitutes a first light absorption region A1, while the region of the lower surface and/or the upper surface of the first light transparent layer 161 which is not overlaid by the second light absorption layer 162 constitutes a first light transparent region T1. The first light absorption region A1 encompasses the first light transparent region T1. In the present embodiment, the position and the shape of the first light transparent region T1 match the position and the shape of the first optical pattern 1211.

Figure 7:
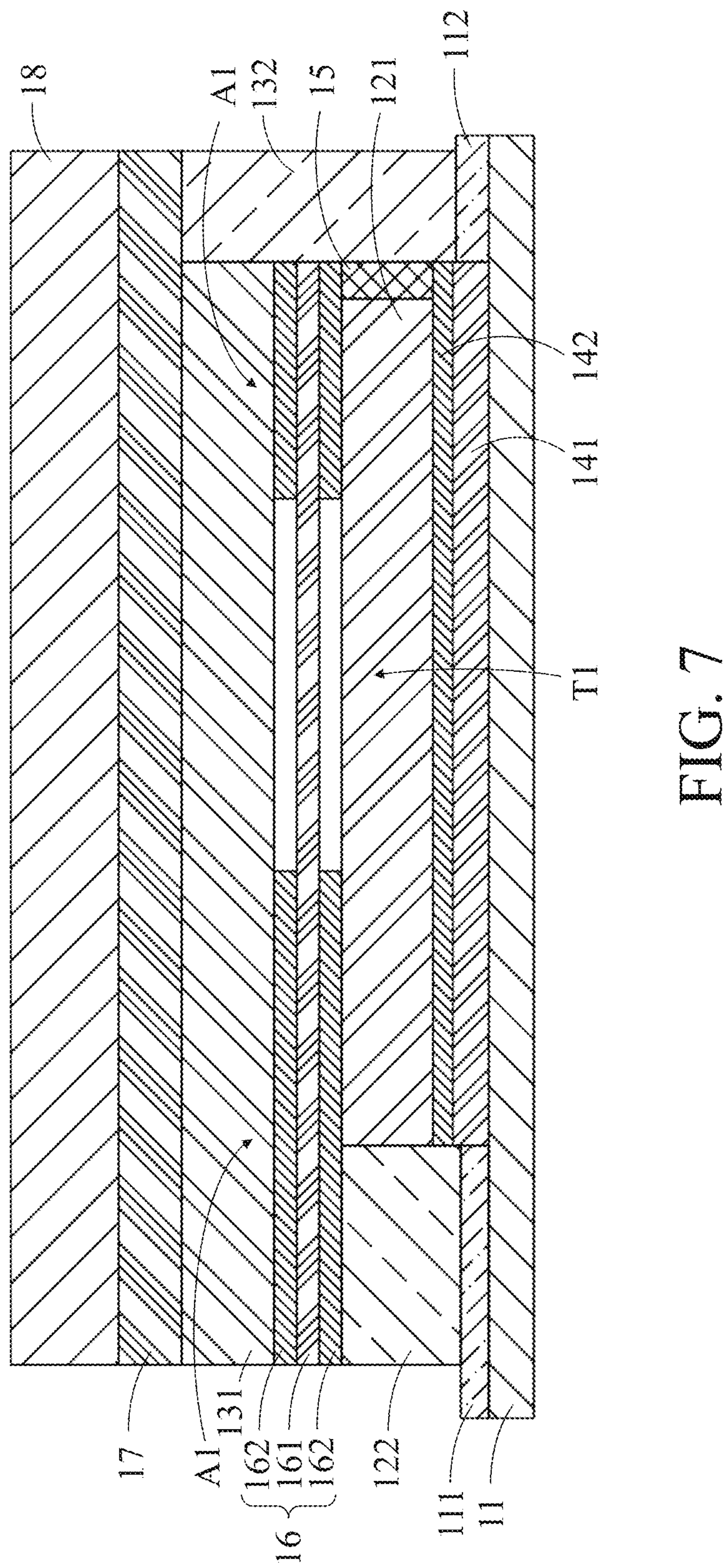
FIG. 7 depicts another cross-section diagram sectioned from A-A' line of FIG. 1 according to the first embodiment of the disclosure.

Referring to FIG. 2 and FIG. 7, the following will elaborate how to further enhance the effects of absorbing the stray light. In the present embodiment, the display device 1 of the disclosure further includes a third light absorption module 17 disposed above the second light guide plate 131 and the second light source 132, and the cover plate 18 is disposed above the third light absorption module 17.

By arranging the third light absorption module 17 above the second light guide plate 131 and the second light source 132, the stray light of the second light guide plate 131 emitted in a direction toward the cover plate 18 and stray light reflected by the cover plate 18 may be absorbed by the third light absorption module 17, and the first light source module 12 and the second light source module 13 are further prevented from generating the light disturbances to enhance the display effects of the display device.

Figure 8:
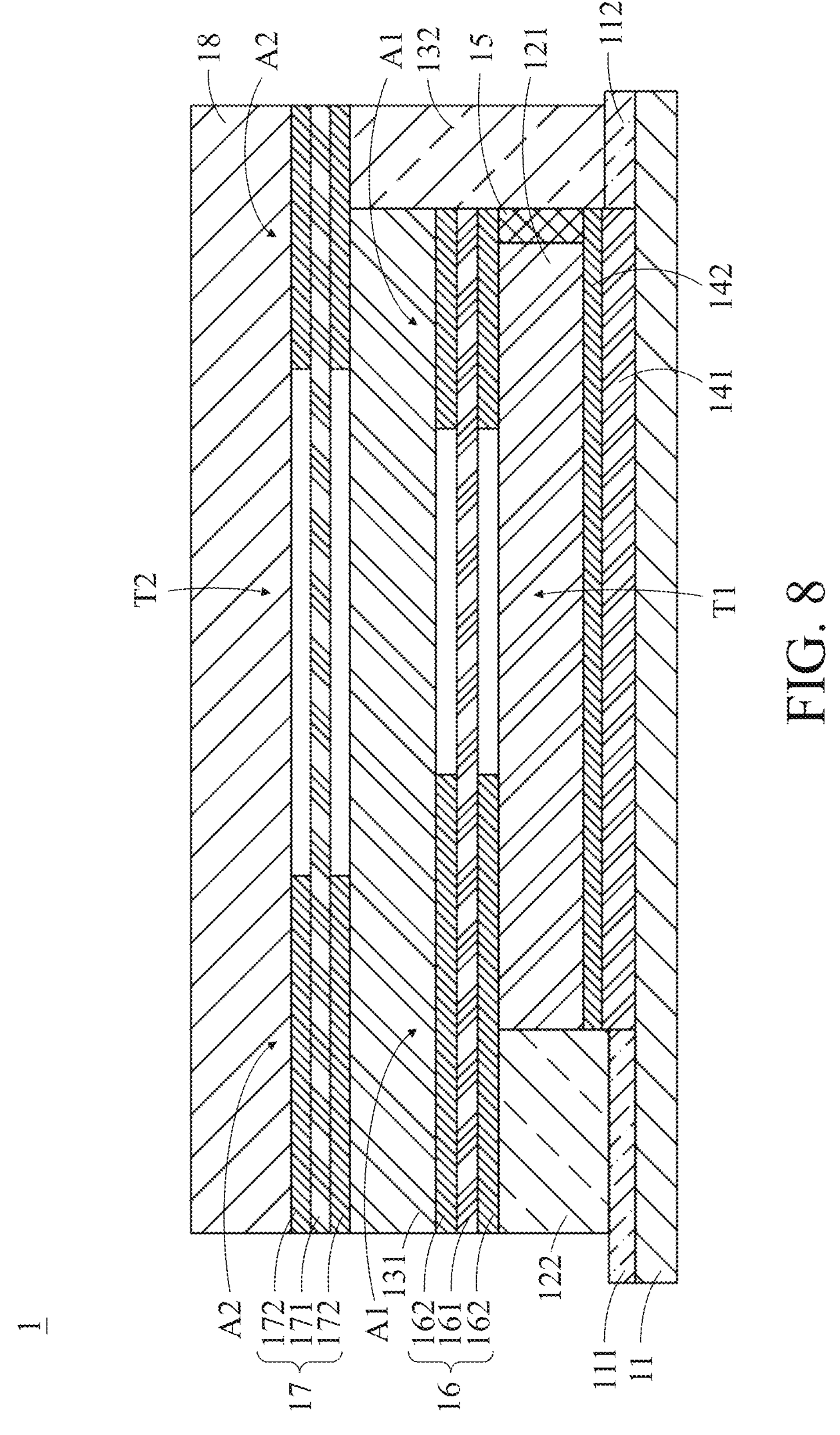
FIG. 8 depicts still another cross-section diagram sectioned from A-A' line of FIG. 1 according to the first embodiment of the disclosure.

Please refer to FIG. 8. In the present embodiment, the third light absorption module 17 includes a second light transparent layer 171 and a third light absorption layer 172. The second light transparent layer 171 is provided with a lower surface and an upper surface in the second direction Y which are opposite. The lower surface of the second light transparent layer 171 is adjacent to the second light guide plate 131 and the second light source 132. The upper surface of the second light transparent layer 171 is adjacent to the cover plate 18. The third light absorption layer 172 partially overlays at least one of the lower surface and the upper surface of the second light transparent layer 171. In the present embodiment, a portion of the lower surface or the upper surface of the second light transparent layer 171 is exposed by the third light absorption layer 172 to form a second light transparent region T2. For example, the second light transparent layer 171 may be composed of polyester films, and the third light absorption layer 172 may be composed of black ink.

In the aforementioned structure, when there is only one layer of third light absorption layer 172, the third light absorption layer 172 may partially overlay the lower surface of the second light transparent layer 171 so that the stray light of the second light guide plate 131 emitted in the direction toward the cover plate 18 may be absorbed by the third light absorption layer 172 and be further prevented from being reflected by the cover plate 18 and being transmitted to the first light source module 12. Alternatively, the third light absorption layer 172 may partially overlay the upper surface of the second light transparent layer 171 so that the stray light of the second light guide plate 131 which is emitted in the direction toward the cover plate 18 and is reflected by the cover plate 18 may be absorbed by the third light absorption layer 172 and be further prevented from being reflected by the cover plate 18 and being transmitted to the first light source module 12. When there are two layers of third light absorption layers 172, two layers of third light absorption layers 172 may partially overlay both of the lower surface and the upper surface of the second light transparent layer 171, and the first light source module 12 and the second light source module 13 are further prevented from generating the light disturbances to enhance the display effects of the display device.

As shown in FIG. 2 and FIG. 8, in the present embodiment, the region of the lower surface and/or the upper surface of the second light transparent layer 171 overlaid by the third light absorption layer 172 constitutes a second light absorption region A2, while the region of the lower surface and/or the upper surface of the second light transparent layer 171 which is not overlaid by the third light absorption layer 172 constitutes a second light transparent region T2. The second light absorption region A2 encompasses the second light transparent region T2, and the second light transparent region T2 overlaps the first light transparent region T1. In the present embodiment, the position and the shape of the second light transparent region T2 match the position and the shape of the first optical pattern 1211 and the position and the shape of the second optical pattern 1311. By the foregoing arrangement, the light reflected by the first optical pattern 1211 may sequentially pass through the first light transparent region T1 and the second light transparent region T2 to show the one display pattern, while the light reflected by the second optical pattern 1311 may pass through the second light transparent region T2 to show the other display pattern.

In addition, in the present embodiment, the surface of the second light absorption layer 162 and the surface of the third light absorption layer 172 may be is matte due to the surface roughness process, thereby reducing the reflectance and the glossiness of the second light absorption layer 162 and the third light absorption layer 172 significantly to further enhance the effects of the light absorption. For example, the reflectance of the second light absorption layer 162 and the reflectance of the third light absorption layer 172 may be separately less than 10%, and the glossiness of the second light absorption layer 162 and the glossiness of the third light absorption layer 172 may be separately less than 10 GU.

Figure 9:
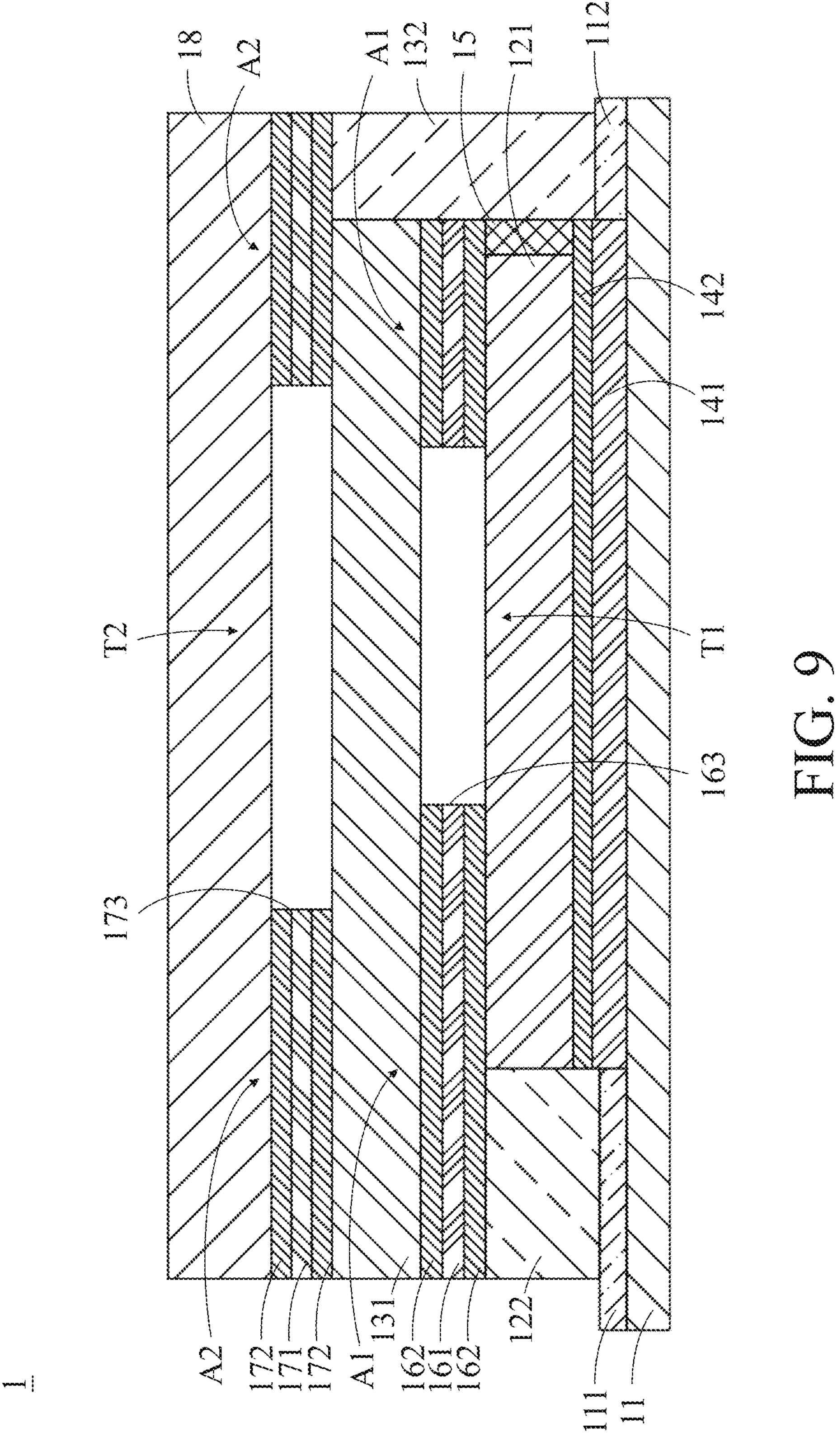
FIG. 9 depicts the cross-section diagram of a display device according to the second embodiment of the disclosure.

With regard to a display device 1 in the second embodiment of the disclosure, referring to FIG. 9, the display device 1 of the second embodiment is similar to the display device 1 of the first embodiment, but there are differences between the display device 1 of the second embodiment and the display device 1 of the first embodiment as follows: there is a first light transparent opening 163 formed on the second light absorption module 16. In other words, the second light absorption module 16 has the first light transparent opening 163. There is a second light transparent opening 173 formed on the third light absorption module 17. In other words, the third light absorption module 17 has the second light transparent opening 173.

In the present embodiment, the first light transparent opening 163 is formed by penetrating the first light transparent layer 161 and the second light absorption layer 162. The second light absorption layer 162 of the second light absorption module 16 may completely overlay at least one of the lower surface and the upper surface of the first light transparent layer 161. In the present embodiment, the region formed by the first light transparent opening 163 constitutes the aforementioned first light transparent region T1, and the position and the shape of the first light transparent opening 163 match the position and the shape of the first optical pattern 1211.

In the present embodiment, the second light transparent opening 173 is formed by penetrating the second light transparent layer 171 and the third light absorption layer 172. The third light absorption layer 172 of the third light absorption module 17 may completely overlay at least one of the lower surface and the upper surface of the second light transparent layer 171. In the present embodiment, the region formed by the second light transparent opening 173 constitutes the aforementioned second light transparent region T2, and the position and the shape of the second light transparent region 173 match the position and the shape of the first optical pattern 1211 and the position and the shape of the second optical pattern 1311.

Figure 10:
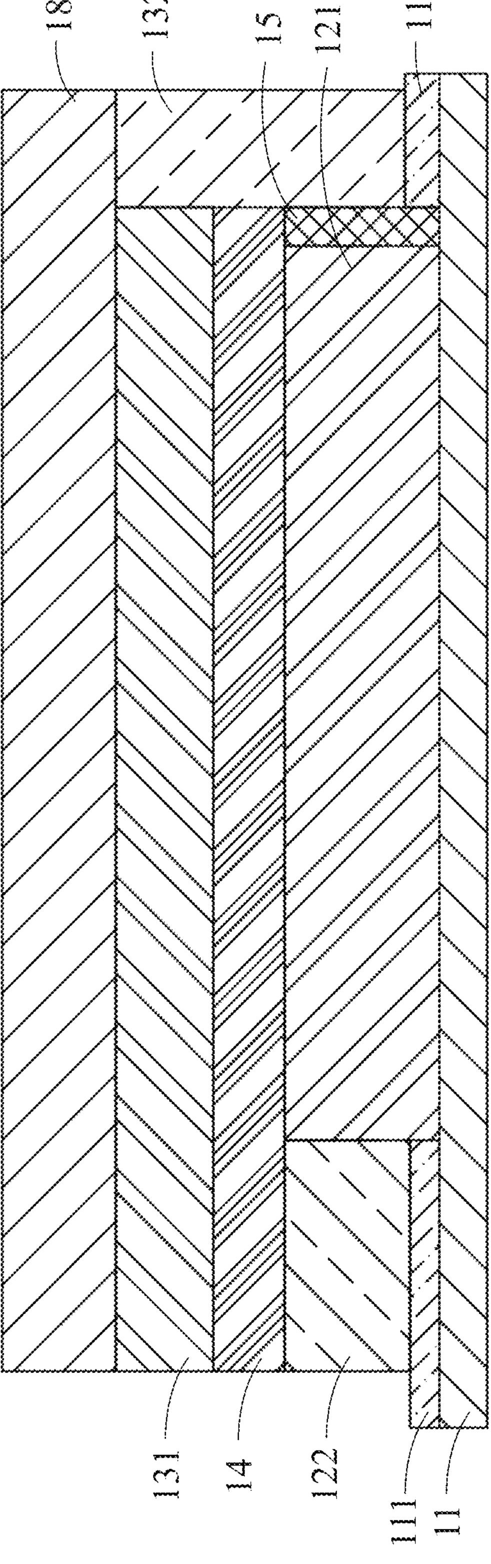
FIG. 10 depicts the cross-section diagram of a display device according to the third embodiment of the disclosure.

With regard to a display device 1 in the third embodiment of the disclosure, referring to FIG. 10, the display device 1 of the third embodiment is similar to the display device 1 of the first embodiment, but there are differences between the display device 1 of the third embodiment and the display device 1 of the first embodiment as follows: the arrangement position of the first light absorption module 14 is different. In the present embodiment, the first light absorption module 14 is disposed between the first light guide plate 121 of the first light source module 12, the first light source 122, and the second light guide plate 131.

By arranging the first light absorption module 14 between the first light guide plate 121, the first light source 122, and the second light guide plate 131, the stray light of the first light guide plate 121 emitted in the direction toward the second light guide plate 131 and the stray light of the second light guide plate 131 emitted in the direction toward the first light guide plate 121 may be absorbed by the first light absorption module 14, and the first light source module 12 and the second light source module 13 are prevented from generating the light disturbances to solve the problem of the undesired illumination of the display patterns of the adjacent light guide plates and to enhance the display effects of the display device.

Figure 11:
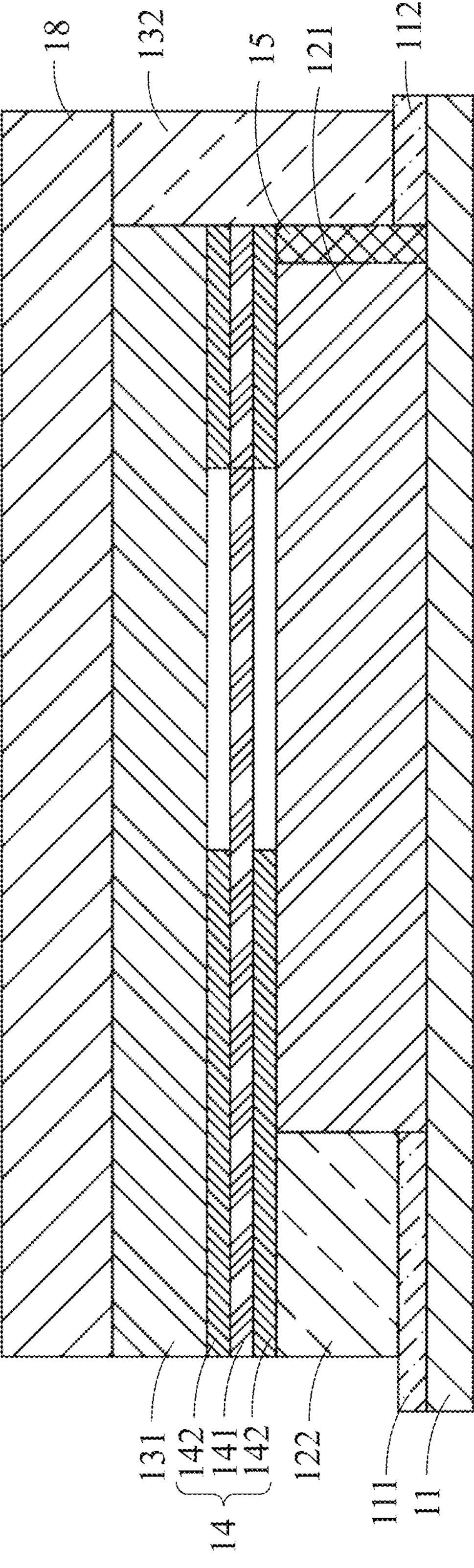
FIG. 11 depicts another cross-section diagram of the display device according to the third embodiment of the disclosure.

Please refer to FIG. 11. In the present embodiment, the first light absorption module 14 includes the transparent substrate 141 and the first light absorption layer 142. The substrate 141 is provided with a lower surface and an upper surface in the second direction Y which are opposite. The lower surface of the substrate 141 is adjacent to the first light guide plate 121, the first light source 122, and the light blocking component 15. The upper surface of the substrate 141 is adjacent to the second light guide plate 131. The first light absorption layer 142 partially overlays at least one of the lower surface and the upper surface of the substrate 141. For example, the substrate 141 may be composed of polyester films.

In the aforementioned structure, when there is only one layer of first light absorption layer 142, the first light absorption layer 142 may partially overlay the lower surface of the substrate 141 or the upper surface of the substrate 141 so that the stray light of the first light guide plate 121 emitted in the direction toward the second light guide plate 131 or the stray light of the second light guide plate 131 emitted in the direction toward the first light guide plate 121 may be absorbed by the first light absorption layer 142. When there are two layers of first light absorption layers 142, two layers of first light absorption layers 142 may partially overlay both of the lower surface and the upper surface of the substrate 141 to absorb the stray light emitted from the first light guide plate 121 and the stray light emitted from the second light guide plate 131, and the first light source module 12 and the second light source module 13 are prevented from generating the light disturbances to further enhance the display effects of the display device.

In view of the above description, the disclosure may prevent the first light source module and the second light source module from generating the light disturbances by arranging the first light absorption module between the circuit board and the first light guide plate or between the first light source module and the second light guide plate, thereby solving the problem of the undesired illumination of the display patterns of the adjacent light guide plates and enhancing the display effects of the display device.

What is claimed is:

1. A display device comprising:

a circuit board;

a first light source module disposed above the circuit board and comprising a first light guide plate and a first light source adjacent to the first light guide plate, wherein the first light guide plate has a first optical pattern;

a second light source module stacked and disposed above the first light source module and comprising a second light guide plate and a second light source adjacent to the second light guide plate, wherein the second light guide plate has a second optical pattern, and the first light source module is disposed between the second light source module and the circuit board; and a first light absorption module disposed between the circuit board and the first light guide plate.

2. The display device according to claim 1, wherein the first light absorption module comprises a substrate disposed between the circuit board and the first light guide plate and a first light absorption layer disposed between the substrate and the first light guide plate.

3. The display device according to claim 1, further comprising a second light absorption module disposed between the first light source module and the second light guide plate.

4. The display device according to claim 3, wherein the second light absorption module comprises:

a first light transparent layer provided with a lower surface and an upper surface which are opposite; and a second light absorption layer overlaying at least one of the lower surface and the upper surface of the first light transparent layer.

5. The display device according to claim 4, wherein a portion of the lower surface or the upper surface of the first light transparent layer is exposed by the second light absorption layer to form a first light transparent region.

6. The display device according to claim 5, wherein a position and a shape of the first light transparent region match a position and a shape of the first optical pattern.

7. The display device according to claim 3, further comprising a third light absorption module disposed above the second light guide plate and the second light source.

8. The display device according to claim 7, wherein the third light absorption module comprises:

a second light transparent layer provided with a lower surface and an upper surface which are opposite; and a third light absorption layer overlaying at least one of the lower surface and the upper surface of the second light transparent layer.

9. The display device according to claim 8, wherein a portion of the lower surface or the upper surface of the second light transparent layer is exposed by the third light absorption layer to form a second light transparent region.

10. The display device according to claim 9, wherein a position and a shape of the second light transparent region match a position and a shape of the first optical pattern and a position and a shape of the second optical pattern.

11. The display device according to claim 7, wherein the second light absorption module has a first light transparent opening, and the second light absorption module has a second light transparent opening; a position and a shape of the first light transparent opening match a position and a shape of the first optical pattern, and a position and a shape of the second light transparent region match a position and a shape of the first optical pattern and a position and a shape of the second optical pattern.

* * * * *